United States Patent
Sun (10) Patent No.: US 9,477,889 B2
(45) Date of Patent: Oct. 25, 2016

(54) FACE RECOGNITION WITH PARALLEL DETECTION AND TRACKING, AND/OR GROUPED FEATURE MOTION SHIFT TRACKING

(71) Applicant: INTEL CORPORATION, Santa Clara, CA (US)

(72) Inventor: Chao Sun, Shanghai (CN)

(73) Assignee: Intel Corporation, Santa Clara, CA (US)

(*) Notice: Subject to any disclaimer, the term of this patent is extended or adjusted under 35 U.S.C. 154(b) by 197 days.

(21) Appl. No.: 14/123,892

(22) PCT Filed: Jun. 27, 2013

(86) PCT No.: PCT/CN2013/078122
§ 371 (c)(1),
(2) Date: Dec. 4, 2013

(87) PCT Pub. No.: WO2014/205715
PCT Pub. Date: Dec. 31, 2014

(65) Prior Publication Data
US 2015/0154455 A1   Jun. 4, 2015

(51) Int. Cl.
*G06K 9/32* (2006.01)
*G06K 9/00* (2006.01)
*G06K 9/46* (2006.01)
(Continued)

(52) U.S. Cl.
CPC ....... *G06K 9/00718* (2013.01); *G06K 9/00248* (2013.01); *G06K 9/00281* (2013.01); *G06K 9/46* (2013.01); *G06K 9/52* (2013.01); *G06T 7/2033* (2013.01); *G06K 2009/3291* (2013.01);
(Continued)

(58) Field of Classification Search
None
See application file for complete search history.

(56) References Cited

U.S. PATENT DOCUMENTS

2010/0104266 A1* 4/2010 Yashiro .............. G06K 9/00295
386/201
2011/0182474 A1* 7/2011 Pope ................. G06K 9/00261
382/103
(Continued)

FOREIGN PATENT DOCUMENTS

| CN | 102214291 A | 10/2011 |
|---|---|---|
| CN | 103116756 A | 5/2013 |
| WO | 2012139269 A1 | 10/2012 |

OTHER PUBLICATIONS

Feris et al, Detection and Tracking of Facial Features in Video Sequences, Lecture Notes in Artificial Intelligence, vol. 1793, pp. 197-206, Apr. 2000.*
(Continued)

*Primary Examiner* — Siamak Harandi
*Assistant Examiner* — Mai Tran
(74) *Attorney, Agent, or Firm* — Schwabe, Williamson & Wyatt, P.C.

(57) ABSTRACT

Apparatuses, methods and storage medium associated with face recognition are disclosed herein. In embodiments, a method for recognizing a face may include detecting, by a first thread of a computing device, for presence of a face in interspersed selected ones of the plurality of image frames. On detecting presence of a face in a first of the selected ones of the plurality of image frames, the first thread requests tracking of the face by a second thread of the computing device, the second thread being operated in parallel to the first thread by the computing device. In response, the face may be tracked for the first thread, by the second thread. Other embodiments may be described and claimed.

24 Claims, 9 Drawing Sheets

(51) Int. Cl.
*G06K 9/52* (2006.01)
*G06T 7/20* (2006.01)

(52) U.S. Cl.
CPC ............... *G06K2009/4666* (2013.01); *G06T 2207/10016* (2013.01); *G06T 2207/30201* (2013.01)

(56) References Cited

U.S. PATENT DOCUMENTS

| | | | | |
|---|---|---|---|---|
| 2011/0221921 | A1* | 9/2011 | Okamoto | G06T 7/0044 348/222.1 |
| 2012/0148094 | A1* | 6/2012 | Huang | G06K 9/00785 382/103 |
| 2012/0243732 | A1* | 9/2012 | Swaminathan | G06T 7/2033 382/103 |
| 2012/0308153 | A1* | 12/2012 | Hwang | G06T 5/002 382/264 |
| 2014/0140572 | A1* | 5/2014 | Ranjan | G06K 9/00993 382/103 |
| 2015/0235379 | A1* | 8/2015 | O'Gorman | G06T 7/2033 382/103 |

OTHER PUBLICATIONS

Feris et al., "Detection and Tracking of Facial Features in Video Sequences," Lecture Notes in Artificial Intelligence, vol. 1793, pp. 197-206, Apr. 2000.*
International Search Report and Written Opinion in related PCT matter Application No. PCT/CN2013/078122, mailed Apr. 3, 2014.
International Preliminary Report on Patentability mailed Jan. 7, 2016 for International Patent Application PCT/CN2013/078122, 7 pages.

* cited by examiner

FACE RECOGNITION WITH PARALLEL DETECTION AND TRACKING, AND/OR GROUPED FEATURE MOTION SHIFT TRACKING

CROSS REFERENCE TO RELATED APPLICATIONS

The present application is a national phase entry under 35 U.S.C. §371 of International Application No. PCT/CN2013/078122, filed Jun. 27, 2013, entitled "FACE RECOGNITION WITH PARALLEL DETECTION AND TRACKING, AND/OR GROUPED FEATURE MOTHION SHIFT TRACKING", which designated, among the various States, the United States of America. The Specification of the PCT/CN2013/078122 Application is hereby incorporated by reference.

TECHNICAL FIELD

The present disclosure relates to the field of data processing, in particular, to apparatuses, methods and storage medium associated with face recognition including, but are not limited to, parallel detection and tracking, and/or grouped feature motion shift tracking.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Advances in general purpose microprocessors, graphics processors, and related technologies have enabled further advances in computer vision. Today, many applications involve face recognition, which typically includes face tracking. Most prior-art face tracker tracks face using a global approach. Global approach typically uses statistical classification techniques to predict an ROI region to decide whether or not a face appears in this ROI region. It often contains a "last detect"—"predict bigger ROI region"—"current detect" steps. It makes face tracking highly dependent on face detection. Because of this dependency, the prior art global approach has at least two disadvantages. A first disadvantage is, when face rotates, or partial occlusions, tracking often fails due to detection failure. Another disadvantage is the inter-dependency prevents the prior art approaches from taking advantage of performance improvement from parallel and/or multi-core processing.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Apparatuses, methods and storage medium associated with face recognition are disclosed herein. In embodiments, a method for recognizing a face may include detecting, by a first thread of a computing device, for presence of a face in interspersed selected ones of the plurality of image frames. On detecting presence of a face in a first of the selected ones of the plurality of image frames, the first thread requests tracking of the face by a second thread of the computing device, the second thread being operated in parallel to the first thread by the computing device. In response, the face may be tracked for the first thread, by the second thread.

In embodiments, the second thread may use a grouping local feature based face tracker. The method may include detecting, by a computing device, presence of a face in one of the plurality of image frames. On detecting presence of a face in one of the plurality of image frames, tracking the face based at least in part on group motion shift of a group of N features in a region of interest, within which the face is located.

In embodiments, an apparatus, e.g., a smartphone or a computing tablet, may include one or more processors, and storage medium having a face detection function and a face tracking function configured to cause the apparatus, in response to operation by the one or more processors, to perform any the above described methods and their variants. In embodiments, at least one storage medium may include instructions configured to cause an apparatus, in response to execution by the apparatus, to perform any the above described methods and their variants. Resultantly, such apparatus may have high response sensitivity when tracking a moving/rotating face.

In the detailed description to follow, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. The term "closed captions" is to include traditional closed captions and/or subtitles.

Figure 1:
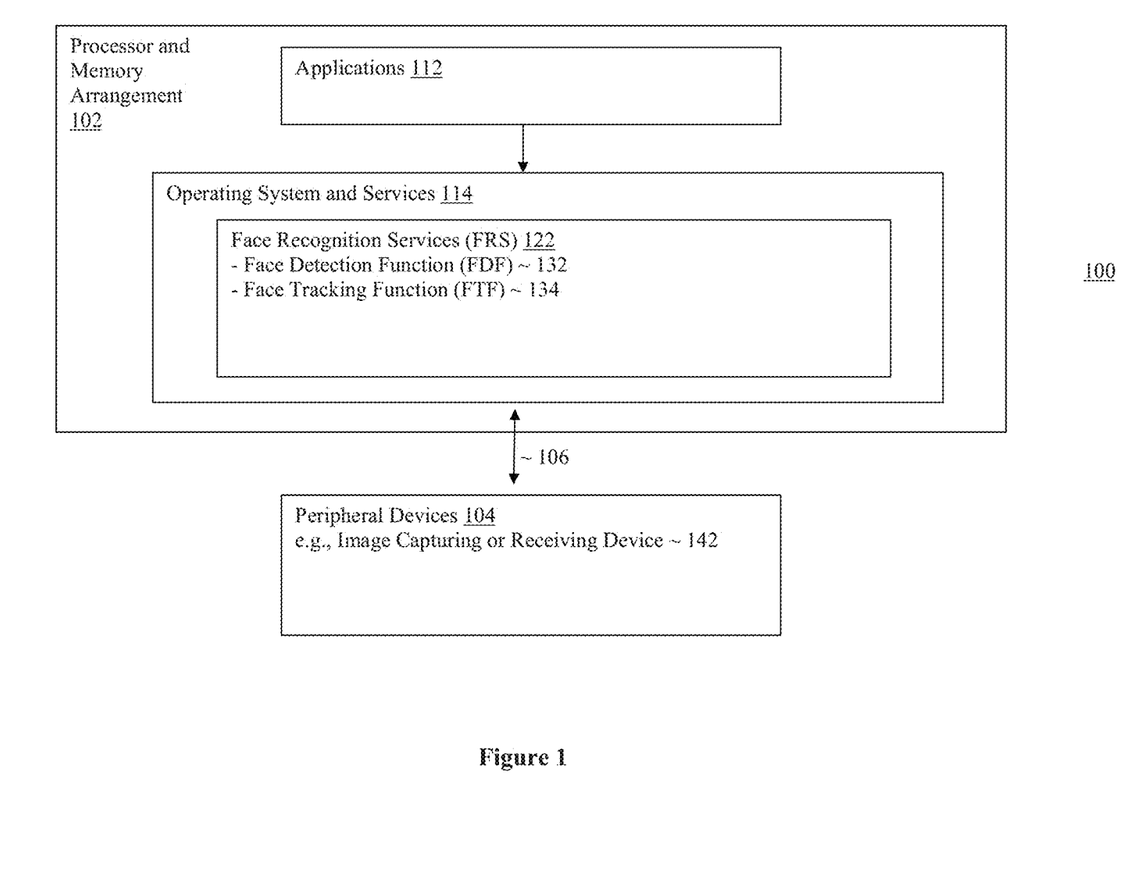
FIG. 1 illustrates an overview of an example computing arrangement incorporated with the teachings of the present disclosure for face tracking, in accordance with various embodiments.

Referring now FIG. 1, an overview of an example computing arrangement incorporated with the teachings of the present disclosure for face recognition, in accordance with various embodiments, is shown. As illustrated, in embodiments, computing arrangement 100 may include processor and memory arrangement 102, and peripheral devices 104, coupled with each other, via coupling 106, as shown. Processor and memory arrangement 102 may be configured to host and execute operating system and services 114 and applications 112, whereas peripheral devices 104 may, e.g., include an image capturing or receiving device 142 configured to capture or receive a number of image frames. An example of an image capture device may be a video camera, whereas, an example of an image receiving device may be a communication interface, configured to couple processor and memory arrangement 102 to a remote image source (not shown) that provides a stream of image frames.

In embodiments, applications 112 may be executed under the control, and/or utilize the services of operating system and services 114. The services provided by operating system and services 114 may include Face Recognition Services 122, which may include but not limited to, Face Detection Function 132 and Face Tracking Function 134. The captured or streamed image frames may be provided to applications 112, which may in turn invoke the services of Face Recognition Services 122 to recognize and/or track one or more faces in the image frames. Face Recognition Services 122, in particular, Face Detection Function 132 and Face Tracking Function 134, will be described in more detail below.

Processor and memory arrangement 102 is intended to represent a broad range of processors and memory devices, including without limitations, arrangements designed for mobile computing. For examples, without limitations, processor may be any one of a number of single or multi-core general or special purpose processors known in the art. One or more general or special purpose processors may be used. An example of a special purpose processor may include, but is not limited to, a graphics processor. Memory may be any one of a number of volatile and/or non-volatile memory known in the art including, but are not limited to, dynamic random access memory (DRAM), FLASH, and so forth. Similarly, one or more memory units may be used.

As described earlier, peripheral devices 104 may include an image capturing device, such as a camera, or a communication interface. In the case of a camera, it may be any one of a wide range of cameras known in the art. In the case of a communication interface, it may likewise be any one of a wide range of wired and/or wireless communication interfaces configured to couple processor and memory arrangement 102 to a personal, local and/or wide area network. An example of wired communication interfaces may include an Ethernet networking interface. Examples of wireless communication interfaces may include interfaces that support WiFi, 3G/4G wireless communications. Local and/or wide area networks may include private and/or public networks, e.g., the Internet.

Further, peripheral devices 104 may include other components, such as storage devices. Storage devices may be any one of a number of optical, magnetic or solid state storage devices. Peripheral devices 104 may also include input and output devices. Input devices may include keyboard or other cursor control and/or gesture recognition devices. Output devices may include display devices. Display devices may be any one of a number of display devices known in the art including, but are not limited to, touch screen displays, which may also serve as an input device. Still further, computing arrangement 100 may include Global Position System (GPS) support, and various sensors.

Processor and memory arrangement 102 and some of peripheral devices 104 may be co-located on the same platform and coupled with each other with coupling 106 being, e.g., a system bus. Processor and memory arrangement 102 and other peripheral devices 104 may be remotely located from each other, and coupled with each other with coupling 106 being, e.g., a communication link. That is, processor and memory arrangement 102 alone, or in conjunction with peripheral devices 104, may form a single computing device, such as a smartphone, a computing tablet, an ultrabook, a laptop, a desktop, a server, a set-top box, a game console, a media player, an e-reader, and so forth.

Still referring to FIG. 1, in various embodiments, Face Detection Function (FDF) 132 may be configured to detect the presence of a face in an image frame, and identify a region of interest (ROI) of the image frame, within which the face is located. Face Tracking Function (FTF) 134, in embodiments, may be configured to track the face within the ROI, for FDF 132, based at least in part on motion shift of up to N features within the ROI as a group. N may be an integer greater than 2. In embodiments, FDF 132 and FTF 134 may be configured to operate in two parallel threads, e.g., a first and a second thread, to potentially enhance overall performance of Face Recognition Services (FRS) 122.

Figure 2:
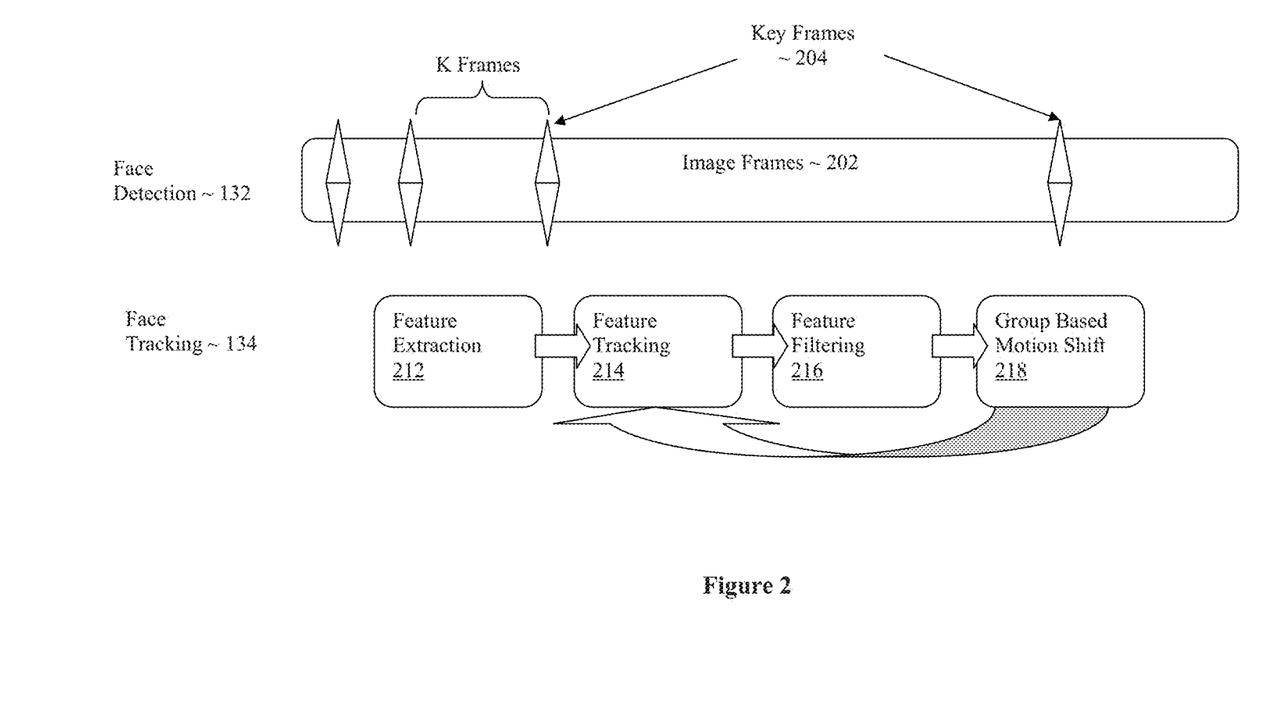
FIG. 2 illustrates parallel face detection and tracking, in accordance with various embodiments.

Referring now to FIG. 2, which illustrates parallel face detection and tracking, in accordance with various embodiments, in further detail. As illustrated, FDF 132 may be configured to detect the presence of a face in an image frame in interspersed selected ones 204 of images frames 202. In embodiments, FDF 132 may be configured to detect the presence of a face in an image frame in every kth image frame 204. For ease of reference, the image frame 204 where FDF 132 performs face detection may be referred to as a key frame. In embodiments, FDF 132 may be also configured to identify a ROI within a key frame, where the face may be located. Further, FDF 132 may be configured to request FTF 134 to track the face within the ROI of a key frame, on its behalf. In response, FTF 134 tracks the face within the ROI for a key frame, in following frames sequence, until FDF 132 requests tracking for another key frame. The process may be repeated until the services of FDF 132 and FTF 134 are no longer needed. In embodiments, tracking error of FTF 134 may be reduced via regular detection by FDF 132.

In embodiments, as illustrated, FTF 134 may be configured to extract N features within a ROI of an image frame, block 212. Additionally, FTF 134 may be configured to iteratively track motion shift of up to N features as a group, blocks 214-218. During each iteration, in block 214, FTF 134 may track movement of the N features. In block 216, FTF 134 may filter out unqualified ones of the tracked features, if any, leaving n features, where n is less than or equal to N. In block 218, FTF 134 may track motion shift of the n features as a group, and regenerate other at least N-n features to fulfill N features set for the next iteration.

In embodiments, FTF 134 may be configured to employ a Feature Accelerated Segment Test (FAST) corner extract algorithm to extract the highest N FAST-corner-response features in block 212. Further, FTF 134 may be configured to perform Kanade-Lucas-Tomasi (KLT) optical flow feature tracking, in block 214, and median filtering to filter out unqualified ones of the tracked features, in block 216. As will be described in more details below, FTF 134 may be configured to track motion shift of the remaining n features as a group, in block 218.

In embodiments, without limitations, FDF 132 and FTF 134 may be implemented with any one of a number of hardware and/or software components. Hardware components may be implemented with application specific integrated circuits (ASIC), and/or programmable integrated circuits, such as field programmable gate arrays (FPGA). Software components may be implemented with any one of a number of programming languages that may be assembled or complied into instructions of the instruction set architecture (ISA) of the underlying hardware.

Figure 3:
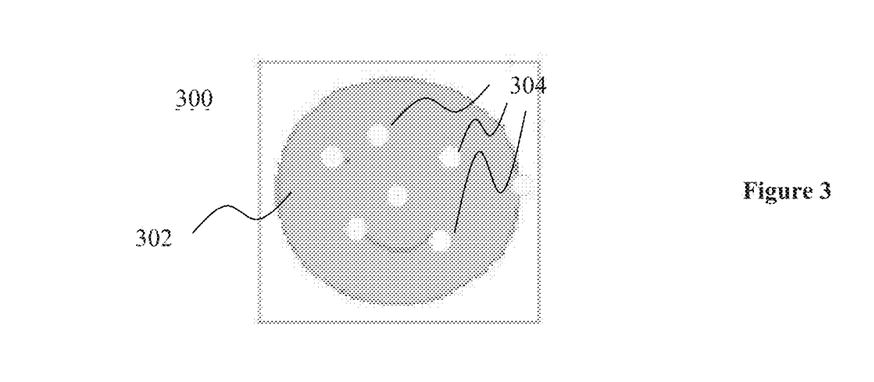
FIG. 3 illustrates features of a region of interest of an image frame, within which a face is located, in accordance with various embodiments.

Referring now to FIGS. 3-10, where various aspects of tracking a face based at least in part on motion shift of n or up to N features (N>=n) as a group, in accordance with various embodiments, are illustrated. First, FIG. 3 illustrates features of a ROI of an image frame, e.g., a key frame, within which a face is located, in accordance with various embodiments. As shown, with a ROI 300, N features 304 may be extracted for face 302, by FTF 134, using, e.g., FAST corner extract algorithm.

Figure 4:
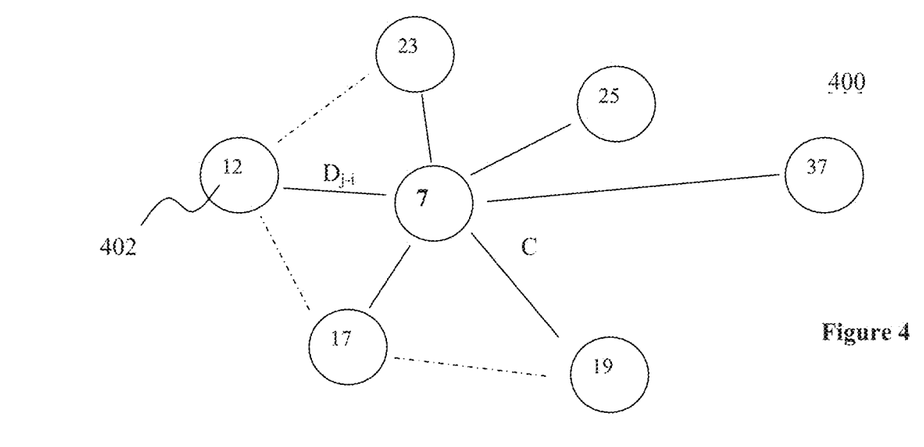
FIG. 4 illustrates grouping of the features using an undirected graph, and determination of a center for the group, in accordance with various embodiments.

FIG. 4 illustrates grouping of the n features (after median filter), by FTF 134, using, e.g., an undirected graph 400, and determination of a center (C) for the group, in accordance with various embodiments. In embodiments, C may be computed using equation #1.

$$C = \arg\min_j \sum_i D_{j,i}. \quad (1)$$

where, $D_{j,i}$ is the weighted distance from feature i to j.

The illustrated value 402 in each group node in FIGS. 4-5 and 7-10 is an example to denote the sum $$-\sum_i D_{j,i}$$

of feature j.

In embodiments, $D_{j-i}$ may be computed using equation #2.

$$D_{j,i} = \frac{1}{w_j} \cdot d_{j,i}. \quad (2)$$

where, $d_{j-i}$ is the pixel distance from feature i to j;

$w_j$ is a weight to parameterize the consistency of velocity.

In general, higher consistency is represented with higher weight and results in lower weighted distance.

Figure 5:
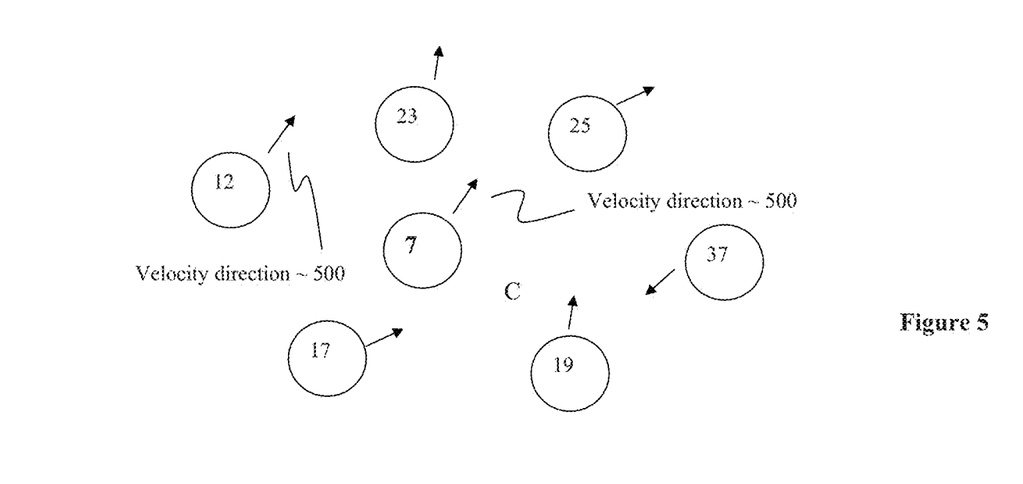
FIGS. 5-7 illustrate determination of a dominant velocity for a group, in accordance with various embodiments.
Figure 6:
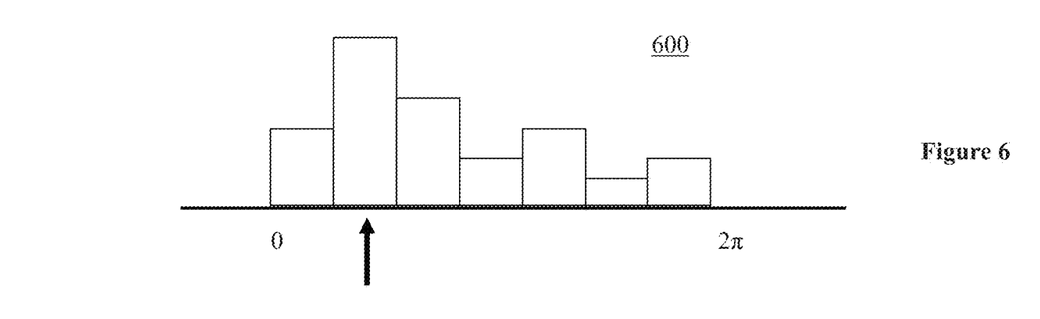
Figure 7:
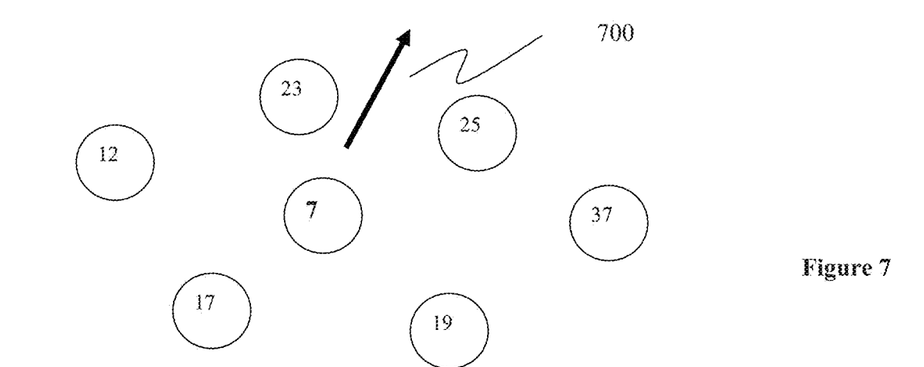

FIGS. 5-7 illustrate determination of a dominant velocity for a group of n features, in accordance with various embodiments. More specifically, FIG. 5 illustrates a number of example velocity directions 500 of a group of n features. In embodiments, as illustrated in FIG. 6, a histogram 600 of the velocity directions may be constructed. Thereafter, a dominant velocity direction may be assigned to the group of n features, based at least in part on the canonical orientation at a peak of histogram 600.

In embodiments, the dominant velocity direction 700 may be denoted by a unit vector û. Further, the velocity consistency weight ($w_j$,j=[1,n]) may be assigned to every feature, using the vector û. More specifically, in embodiments, the velocity consistency weight may be assigned based on cosine of the angle of two vectors to parameterize the weight, and calculated using a vector operation, as set for by equation #3 below:

$$w_j = a + \cos\theta = a + \frac{\hat{u} \cdot v_j}{|\hat{u}| \times |v_j|}. \quad (3)$$

where $w_j$ denotes the feature j's weight, $v_j$ is the velocity vector of feature j, θ is the angle between $v_j$ and the û, a is a factor to tune the influence of $w_j$.

Thus, with the definition of weighted distance, the graph center C can effectively represent the average location and movement trend of the whole group.

Figure 8:
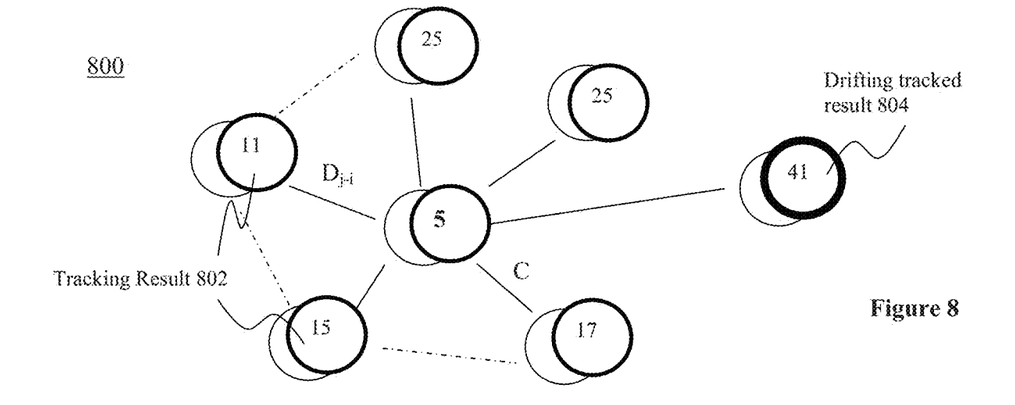
FIGS. 8-10 illustrate eliminating drifting features and re-converging features of a group, in accordance with various embodiments.
Figure 9:
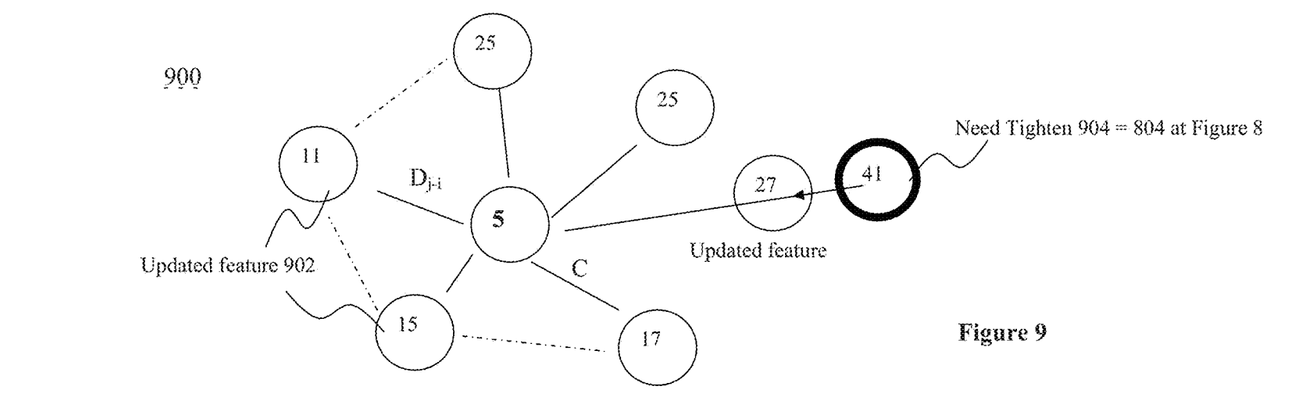
Figure 10:
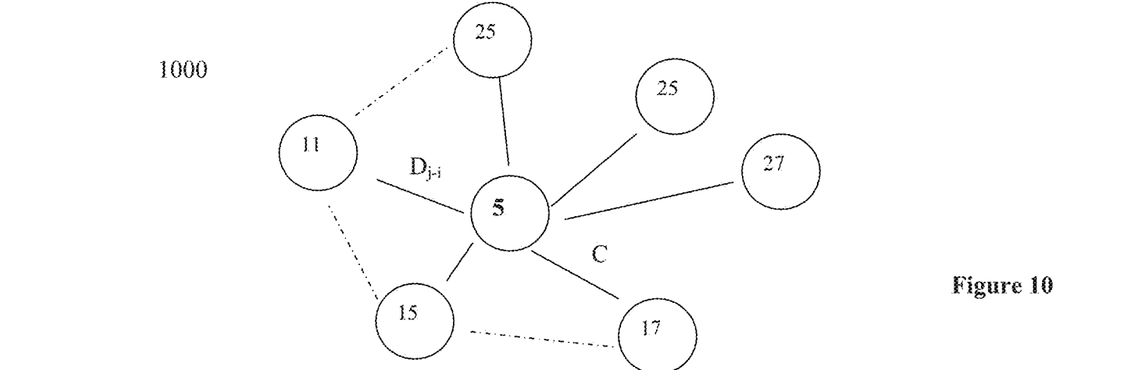

Referring now to FIGS. 8-10, wherein an example tracking and updating of n or up to N features (N>=n) is illustrated, in accordance with various embodiments. More specifically, FIG. 8 illustrates an example tracking result 800 of an example group of n or up to N features (N>=n), by FTF 134. Example features 802, illustrated with slightly bolded circumferences, denote the good tracked results. Whereas example features 804, illustrated with the double bolded circumferences, denote the drifting tracked result, which may be updated, e.g., via converging. FIG. 9 illustrates the process of converging the drifting tracked result, using the graph center C, e.g., tightening feature 904 which is 804 in FIG. 8, and updating to features 902. The tightening process may eliminate 902 and then re-extract new feature between C to 904. FIG. 10 illustrates the group motion shift result 1000 of the example group of n or up to N features (N>=n). Thereafter, the feature group may be renewed by regenerating other N-n features to fulfill N features set for the next iteration.

Figure 11:
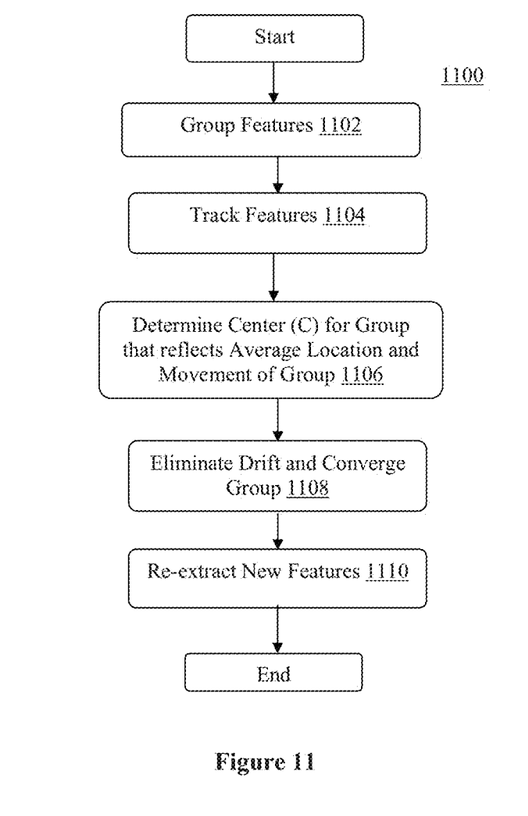
FIGS. 11-12 illustrate an example process for tracking features based on motion shift of features as a group, in accordance with various embodiments.
Figure 12:
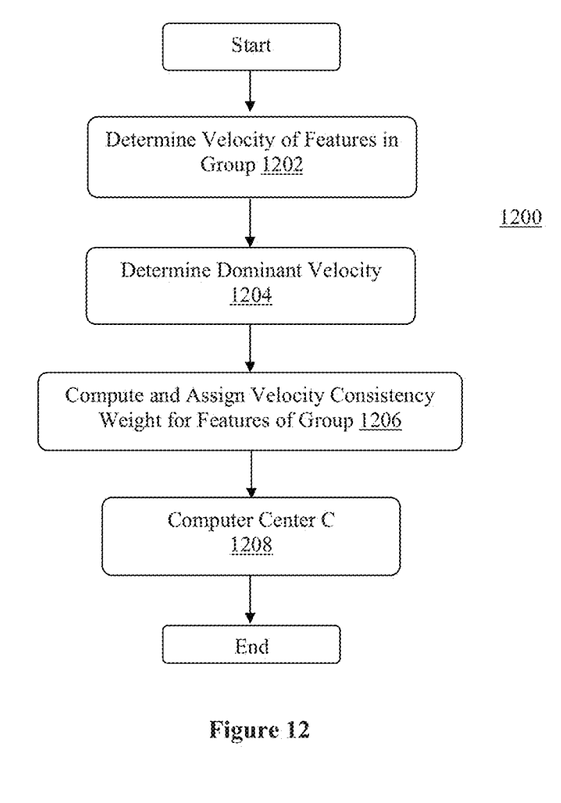

FIGS. 11-12 illustrate an example process for tracking features based on motion shift of the features as a group, in accordance with various embodiments. As illustrated, process 1100 for tracking features based on motion shift of the features as a group may include various operations performed at blocks 1102-1110. The operations may be performed to track a face, such as, during an iteration of an iterative group based motion shift tracking, e.g., by FTF 134.

As shown, process 1100 may begin at block 1102. At block 1102, n features may be first joined as a group. As described earlier, the n features may be features extracted from a ROI of an image frame. From block 1102, process 1100 may proceed to block 1104. At block 1104, movement of the features may be tracked. For example, movement of the features may be tracked in accordance with KLT optical flow tracking, as earlier described.

From block 1104, process 1100 may proceed to block 1106. At block 1106, a center C of the group that reflects the average location and motion of the group may be determined. For example, center C may be determined based at least in part on the pixel distances between the features, weighted by their consistency of velocity, as earlier described. From block 1106, process 1100 may proceed to block 1108. At block 1108, with reference to the determined center C, drifted features of the group that are too far from center C may be eliminated, and the group of features re-converged again. What constitute too far may be configured on an application basis, depending on, e.g., accuracy desired. Re-convergence of the group may comprise reconstituting a group of n features, from a neighborhood of center C. From block 1108, process 1100 may proceed to block 1110. At block 1110, near the determined center C, new features may be re-extracted so as to fulfill N-features set. The size and shape of the neighborhood may also be configured on an application basis, depending on, e.g., accuracy desired.

FIG. 12 illustrates a process for determining a center C of a group that reflects the average location and movement of the features of the group, in accordance with various embodiments. As illustrated, process 1200 for determining such a center C for a group may include various operations performed at blocks 1202-1208. The operations may be performed, e.g., for block 1106 of process 1100, by FTF 134.

As shown, process 1200 may begin at block 1202. At block 1202, the velocity directions of the various features may be determined. From block 1202, process 1200 may proceed to block 1204. At block 1204, a dominant velocity may be determined. The dominant velocity may be determined, e.g., using a histogram, and in accordance with a canonical direction at the peak of the histogram, as earlier described.

From block 1204, process 1200 may proceed to block 1206. At block 1206, velocity consistency weights for the features of the group may be determined and assigned. For example, the velocity consistency weights may be computed using a unity vector, as earlier described. From block 1206, process 1200 may proceed to block 1208. At block 1208, the center C for the group that reflects the average location and motion of the group may be calculated. For example, the center C may be calculated based at least in part on the pixel distances between the features, weighted by their velocity consistencies, as described earlier.

Figure 13:
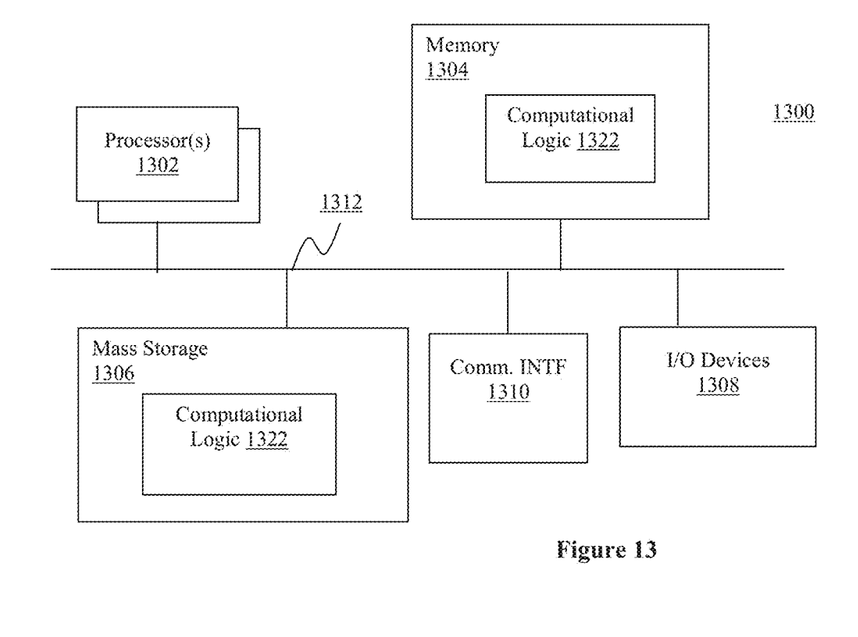
FIG. 13 illustrates an example computing environment suitable for practicing the present disclosure, in accordance with various embodiments.

Referring now to FIG. 13, wherein an example computer suitable for use for the arrangement of FIG. 1, in accordance with various embodiments, is illustrated. As shown, computer 1300 may include one or more processors or processor cores 1302, and system memory 1304. For the purpose of this application, including the claims, the terms "processor" and "processor cores" may be considered synonymous, unless the context clearly requires otherwise. Additionally, computer 1300 may include mass storage devices 1306 (such as diskette, hard drive, compact disc read only memory (CD-ROM) and so forth), input/output devices 1308 (such as display, keyboard, cursor control, camera and so forth) and communication interfaces 1310 (such as network interface cards, modems and so forth). The elements may be coupled to each other via system bus 1312, which may represent one or more buses. In the case of multiple buses, they may be bridged by one or more bus bridges (not shown).

Each of these elements may perform its conventional functions known in the art. In particular, system memory 1304 and mass storage devices 1306 may be employed to store a working copy and a permanent copy of the programming instructions implementing the operations associated with FDF 132 and/or FTF 134 of FIG. 1, earlier described, collectively denoted as computational logic 1322. The various elements may be implemented by assembler instructions supported by processor(s) 1302 or high-level languages, such as, for example, C, that can be compiled into such instructions.

The permanent copy of the programming instructions may be placed into permanent/mass storage devices 1306 in the factory, or in the field, through, for example, a distribution medium (not shown), such as a compact disc (CD), or through communication interface 1310 (from a distribution server (not shown)). That is, one or more distribution media having an implementation of the agent program may be employed to distribute the agent and program various computing devices.

The number, capability and/or capacity of these elements 1310-1312 may vary, depending on the intended use of example computer 1300, e.g., whether example computer 1300 is a stationary computing device like a set-top box or a desktop computer, or a mobile computing device, like a smartphone, tablet, ultabook or laptop. The constitutions of these elements 1310-1312 are otherwise known, and accordingly will not be further described.

Figure 14:
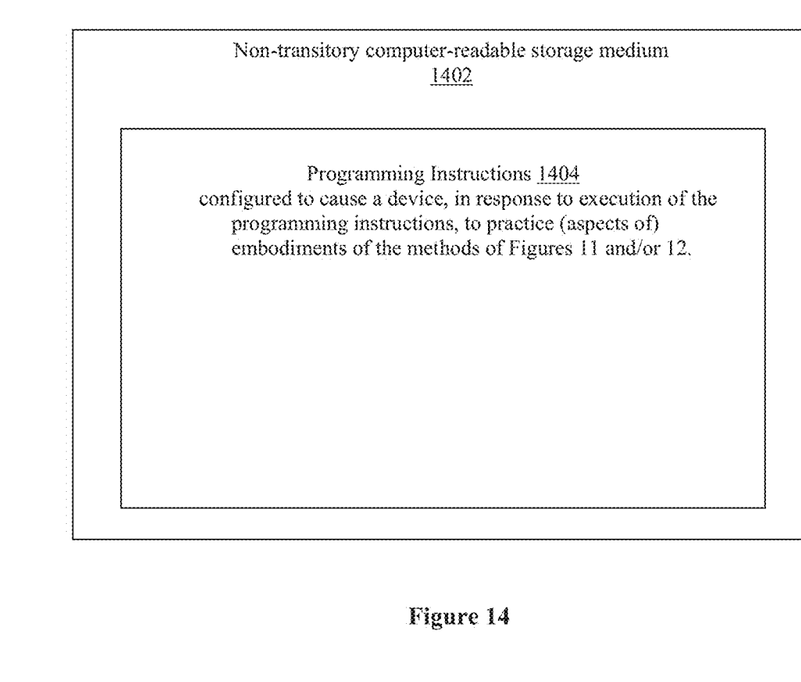
FIG. 14 illustrates an example storage medium with instructions configured to enable an apparatus to practice various aspects of the present disclosure, in accordance with various embodiments.

FIG. 14 illustrates an example non-transitory computer-readable storage medium having instructions configured to practice all or selected ones of the operations associated with FDF 132 and FTF 134 of FIG. 1, earlier described; in accordance with various embodiments. As illustrated, non-transitory computer-readable storage medium 1402 may include a number of programming instructions 1404. Progrannmming instructions 1404 may be configured to enable a device, e.g., computer 1300, in response to execution of the programming instructions, to perform, e.g., various operations of processes 1100 and/or 1200 of FIG. 11 and/or 12. In alternate embodiments, programming instructions 1404 may be disposed on multiple non-transitory computer-readable storage media 1402 instead.

Referring back to FIG. 13, for one embodiment, at least one of processors 1302 may be packaged together with computational logic 1322 (in lieu of storing in memory 1304 and/or mass storage devices 1306) configured to practice aspects of the process(es) of FIG. 11 and/or 12. For one embodiment, at least one of processors 1302 may be packaged together with computational logic 1322 configured to practice aspects of the process(es) of FIG. 11 and/or 12 to form a System in Package (SiP). For one embodiment, at least one of processors 1302 may be integrated on the same die with computational logic 1322 configured to practice aspects of the process(es) of FIG. 11 and/or 12. For one embodiment, at least one of processors 1302 may be packaged together with computational logic 1322 configured to practice aspects of the process(es) of FIG. 11 and/or 12 to form a System on Chip (SoC). For at least one embodiment, the SoC may be utilized in, e.g., but not limited to, a computing tablet.

Thus, example embodiments described include, but are not limited to:

Example 1 which may be a method for recognizing a face in a plurality of image frames. The method may include detecting, by a first thread of a computing device, for presence of a face in interspersed selected ones of the plurality of image frames. On detecting presence of a face in a first of the selected ones of the plurality of image frames, requesting, by the first thread, tracking of the face by a second thread of the computing device, the second thread being operated in parallel to the first thread by the computing device; and tracking the face for the first thread, by the second thread.

Example 2 may be example 1, wherein detecting comprises detecting for presence of a face in every kth one of the plurality of image frames, where k is an integer greater than or equal to 2.

Example 3 may be any one of example 1 or 2, wherein tracking the face comprises iteratively tracking the face, between two detections, based at least in part on group motion shift of a group of N features in a region of interest, within which the face is located.

Example 4 may be example 3, wherein iteratively tracking, between two detections, the face based at least in part on group motion shift of a group of N features in a region of interest, within which the face is located, comprises extracting N features from the region of interest within which the face is located, where N is an integer greater than or equal to 2; and iteratively tracking motion shift of a subset or all N features as a group.

Example 5 may be example 4, wherein extracting N features comprises extracting N features by extracting corners through segment testing.

Example 6 may be example 4, wherein iteratively tracking motion shift of a subset or all N features as a group comprises: for each iteration, tracking all N features; filtering out unqualified ones of the tracked N features, leaving n features, where n is smaller than N; determining motion shift of the n features as a group, based at least in part of a result of the tracking; and re-extracting, from the region of interest, other N-n features to fulfill N features set, for the next iteration, based at least in part on determined motion shift of the group of n features.

Example 7 may be example 6, wherein tracking the N features comprises tracking the N features using Kanade-Lucas-Tomasi (KLT) feature tracking.

Example 8 may be example 6, wherein filtering comprises median filtering of the N features.

Example 9 may be example 6, wherein determining motion shift of the n features as a group comprises determining a center for a group formed with the n features, based at least in part on pixel distances between the n features respectively weighed by weights that parameterize consistency of velocities of the n features.

Example 10 may be example 9, wherein determining a center for a group formed with the n features comprises generating an undirected graph to group the n features, and determining the center using an adjacency matrix representation of the undirected graph.

Example 11 may be example 9, wherein determining motion shift of the n features as a group further comprises determining a dominant velocity orientation of the group, and determining the weights, based at least in part on consistency of velocity of a feature with dominant velocity of the group. Determining the dominant velocity orientation of the group may include usage a histogram of velocity.

Example 12 may be example 9, further comprising for each iteration, filtering too far away unqualified ones of the n features, using weighted distances between the determined center of the group and the n features. Filtering too far away unqualified ones of the n features may be effectuated by eliminating an original one of the n features, and then re-extract a new one between center for a group and the eliminated original one of the n features.

Example 13 may be example 9, wherein re-extracting, from the region of interest, other N-n features to fulfill N-features set, for the next iteration, comprises re-extracting, from a neighborhood region of the center of the group of n features, another N-n features, for the next iteration.

Example 14 may be an apparatus for recognizing a face, comprising one or more processors: and storage medium coupled to the one or more processors, and having a first and a second plurality of modules configured to cause the apparatus, in response to parallel operation of the first and second plurality of modules by the one or more processors, to perform any one of the methods of examples 1-13.

Example 15 may be example 14, wherein the apparatus is a selected one of a set-top box, a smartphone, a computing tablet, an ultrabook, a laptop computer, a desktop computer, a server computer, a game console, or a media player.

Example 16 may be at least one storage medium comprising a plurality of instructions configured to cause an apparatus, in response to execution of the instructions by the apparatus, to perform any one of the methods of examples 1-13.

Example 17 may be a method for recognizing a face in a plurality of image frames, comprising: detecting, by a computing device, presence of a face in one of the plurality of image frames; and on detecting presence of a face in one of the plurality of image frames, tracking the face based at least in part on group motion shift of a group of N features in a region of interest, within which the face is located.

Example 18 may be example 17, wherein tracking the face based at least in part on group motion shift of a group of N features in a region of interest, within which the face is located, comprises: extracting N features from the region of interest within which the face is located, where N is an integer greater than or equal to 2; and tracking motion shift of a subset or all N features as a group.

Example 19 may be example 18, wherein tracking motion shift of a subset or all N features as a group comprises: tracking all N features; filtering out unqualified ones of the tracked N features, leaving n features, where n is smaller than N; and determining motion shift of the n features as a group, based at least in part of a result of the tracking.

Example 20 may be example 19, wherein determining motion shift of the n features as a group comprises determining a center for a group formed with the n features, based at least in part on pixel distances between the n features respectively weighed by weights that parameterize consistency of velocities of the n features.

Example 21 may be example 20, wherein determining a center for a group formed with the n features comprises generating an undirected graph to group the n features, and determining the center using an adjacency matrix representation of the undirected graph.

Example 22 may be example 20, wherein determining motion shift of the n features as a group further comprises determining a dominant velocity orientation of the group, and determining the weights, based at least in part on consistency of velocity of a feature with dominant velocity of the group. Determining the dominant velocity orientation of the group may include usage a histogram of velocity.

Example 23 may be example 20, further comprising filtering too far away unqualified ones of the n features, using weighted distances between the determined center of the group and the n features. Filtering too far away unqualified ones of the n features may be effectuated by eliminating an original one of the n features, and then re-extract a new one between center for a group and the eliminated original one of the n features.

Example 24 may be an apparatus for recognizing a face, comprising one or more processors; and storage medium coupled to the one or more processors, and having a plurality of modules configured to cause the apparatus, in response to operation of the plurality of modules by the one or more processors, to perform any one of the methods of examples 17-23.

Example 25 may be at least one storage medium comprising a plurality of instructions configured to cause an apparatus, in response to execution of the instructions by the apparatus, to perform any one of the methods of examples 17-23.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An apparatus for recognizing a face, comprising:
   one or more processors; and
   a storage medium coupled to the one or more processors, and having a first and a second plurality of modules configured to cause the apparatus, in response to parallel operation of the first and second plurality of modules by the one or more processors, to:
   detect, with a first thread, for presence of a face in interspersed selected ones of a plurality of image frames;
   on detecting presence of the face in a first of the selected ones of the plurality of image frames, request, by the first thread, tracking of the face by a second thread, wherein the second thread is operated in parallel to the first thread; and
   track the face for the first thread, with the second thread, based at least in part on a dominant velocity orientation associated with the face, wherein to track the face with the second thread comprises to determine velocity orientations associated with a plurality of features of the face, and to determine the dominant velocity orientation based on the velocity orientations associated with the plurality of features of the face.

2. The apparatus of claim 1, wherein the apparatus is a selected one of a set-top box, a smartphone, a computing tablet, an ultrabook, a laptop computer, a desktop computer, a server computer, a game console, or a media player.

3. A method for recognizing a face in a plurality of image frames, comprising:
   detecting, by a computing device, presence of a face in one of the plurality of image frames;
   on detecting presence of the face in one of the plurality of image frames, tracking the face based at least in part on group motion shift of a group of N features or a subset of the group of N features in a region of interest, within which the face is located,
   wherein tracking the face includes:
   tracking N features in the region of interest;
   filtering out one or more of the tracked N features, when the one or more of the tracked N features are unqualified features, to have remaining n features, where n is smaller than N; and
   tracking the n features.

4. The method of claim 3, wherein tracking the face based at least in part on group motion shift of a group of N features in a region of interest, within which the face is located, comprises:
   extracting N features from the region of interest within which the face is located, where N is an integer greater than or equal to 2; and
   tracking motion shift of a subset or all N features as a group.

5. The method of claim 4, wherein tracking motion shift of a subset or all N features as a group comprises:
   tracking all N features;
   filtering out unqualified ones of the tracked N features, leaving n features, where n is smaller than N; and
   determining motion shift of the n features as a group, based at least in part on a result of the tracking.

6. The method of claim 5, wherein determining motion shift of the n features as a group comprises determining a center for a group formed with the n features, based at least in part on pixel distances between the n features respectively weighed by weights that parameterize consistency of velocities of the n features.

7. The method of claim 6, wherein determining a center for a group formed with the n features comprises generating an undirected graph to group the n features, and determining the center using an adjacency matrix representation of the undirected graph.

8. The method of claim 6, wherein determining motion shift of the n features as a group further comprises determining a dominant velocity orientation of the group, and determining the weights, based at least in part on consistency of velocity of a feature with dominant velocity of the group.

9. The method of claim 6, further comprising filtering too far away unqualified ones of the n features, using weighted distances between the determined center of the group and the n features.

10. An apparatus for recognizing a face, comprising:
    one or more processors; and
    a storage medium coupled to the one or more processors, and having a plurality of modules configured to cause the apparatus, in response to operation of the plurality of modules by the one or more processors, to:
    detect presence of a face in one of a plurality of image frames; and
    on detection of presence of the face in one of the plurality of image frames, track the face based at least in part on group motion shift of a group of N features or a subset of the group of N features in a region of interest, within which the face is located,
wherein to track the face includes to:
track N features in the region of interest,
filter out one or more of the tracked N features, when the one or more of the tracked N features are unqualified features, to have remaining n features, where n is smaller than N, and
track the n features.

11. The apparatus of claim 10, wherein the apparatus is a selected one of a set-top box, a smartphone, a computing tablet, an ultrabook, a laptop computer, a desktop computer, a server computer, a game console, or a media player.

12. At least one non-transitory storage medium comprising a plurality of instructions configured to cause an apparatus, in response to execution of the instructions to:
detect, with a first thread, for presence of a face in interspersed selected ones of a plurality of image frames;
on detecting presence of the face in a first of the selected ones of the plurality of image frames, request, by the first thread, tracking of the face by a second thread, wherein the second thread is operated in parallel to the first thread; and
track the face for the first thread, with the second thread, based at least in part on a dominant velocity orientation associated with the face, wherein to track the face with the second thread comprises to determine velocity orientations associated with a plurality of features of the face, and to determine the dominant velocity orientation based on the velocity orientations associated with the plurality of features of the face.

13. The storage medium of claim 12, wherein detect comprises detect for presence of the face in every kth one of the plurality of image frames, where k is an integer greater than or equal to 2.

14. The storage medium of claim 12, wherein track the face comprises iteratively track the face, between two detections, based at least in part on group motion shift of a group of N features in a region of interest, within which the face is located.

15. The storage medium of claim 14, wherein iteratively track the face, between two detections, based at least in part on group motion shift of a group of N features in a region of interest, within which the face is located, comprises:
extract N features from the region of interest within which the face is located,
where N is an integer greater than or equal to 2; and
iteratively track motion shift of a subset or all N features as a group.

16. The storage medium of claim 15, wherein extract N features comprises extract N features via extraction of corners through segment testing.

17. The storage medium of claim 15, wherein iteratively track motion shift of a subset or all N features as a group comprises:
for each iteration,
track all N features;
filter out unqualified ones of the tracked N features, to leave n features, where n is smaller than N;
determine motion shift of the n features as a group, based at least in part on a result of the track; and
re-extract, from the region of interest, other N-n features to fulfill N features set, for a next iteration, based at least in part on determined motion shift of the group of n features.

18. The storage medium of claim 17, wherein track the N features comprises track the N features using Kanade-Lucas-Tomasi (KLT) feature tracking.

19. The storage medium of claim 17, wherein filter comprises median filter of the N features.

20. The storage medium of claim 17, wherein determine motion shift of the n features as a group comprises determine a center for a group formed with the n features, based at least in part on pixel distances between the n features respectively weighed by weights that parameterize consistency of velocities of the n features.

21. The storage medium of claim 20, wherein determine a center for a group formed with the n features comprises generate an undirected graph to group the n features, and determine the center using an adjacency matrix representation of the undirected graph.

22. The storage medium of claim 20, wherein determine motion shift of the n features as a group further comprises determine a dominant velocity orientation of the group, and determine the weights, based at least in part on consistency of velocity of a feature with dominant velocity of the group.

23. The storage medium of claim 20, further comprising for each iteration, filter too far away unqualified ones of the n features, using weighted distances between the determined center of the group and the n features.

24. The storage medium of claim 20, wherein re-extract, from the region of interest, other N-n features to fulfill N features set, for the next iteration, comprises re-extract, from a neighborhood region of the center of the group of n features, the other N-n features, for the next iteration.

* * * * *